UNITED STATES PATENT OFFICE.

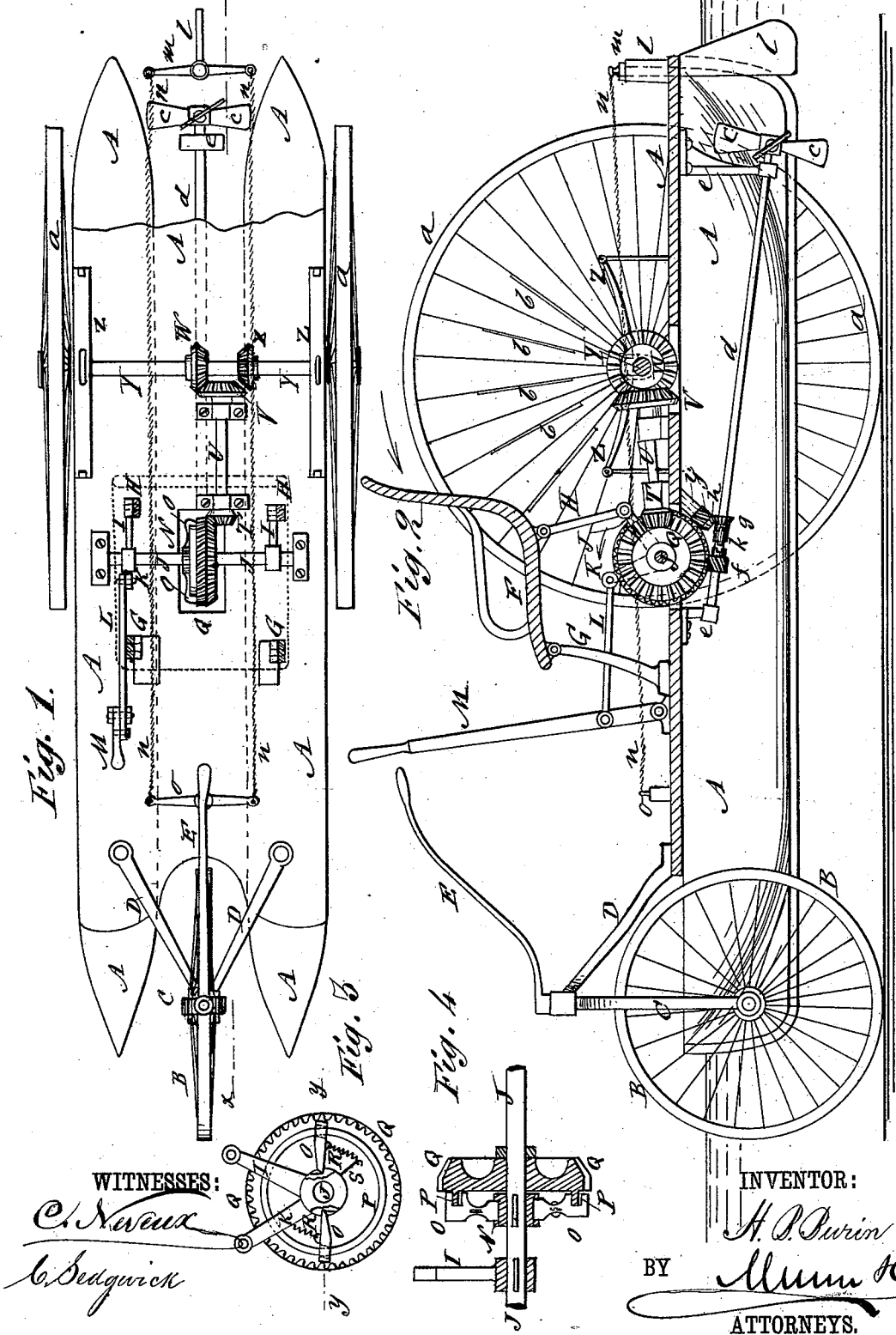

HENRI B. BURIN, OF NEW YORK, N. Y.

VELOCIPEDE.

SPECIFICATION forming part of Letters Patent No. 234,954, dated November 30, 1880.

Application filed June 4, 1880. (No model.)

*To all whom it may concern:*

Be it known that I, HENRI B. BURIN, of the city, county, and State of New York, have invented a new and useful Improvement in Combined Land and Water Velocipedes, of which the following is a specification.

Figure 1 is a plan view of the improvement. Fig. 2 is a sectional side elevation taken through the line *x x*, Fig. 1. Fig. 3 is a side elevation of the friction-clutch. Fig. 4 is a sectional elevation of the clutch, taken through the line *y y*, Fig. 3.

The object of this invention is to furnish velocipedes simple in construction and easily propelled, and which shall be so constructed that they may be used upon land and water with equal facility.

Similar letters of reference indicate corresponding parts.

A represents the body of the velocipede, which is made in the form of two boats placed side by side and connected by the deck, as shown in Figs. 1 and 2. The forward end of the body A is supported by a wheel, B, placed between the forward ends of the side parts or boats of the body A. The wheel B is pivoted to a forked or slotted standard, C, the upper end of which passes through and works in the forward end of an upwardly-inclined bracket, D, attached to the forward part of the body A.

To the upper end of the standard C is attached a lever or handle, E, which projects back into such a position that it can be reached and operated by the driver from his seat F to guide the velocipede. The forward part of the seat F is hinged to the upper ends of standards G, attached at their lower ends to the body A.

To the rear part of the seat F are hinged the upper ends of bars H, the lower ends of which are hinged to the ends of arms I, keyed or otherwise secured to the shaft J. To the shaft J is also secured an arm, K, to the end of which is pivoted the end of a connecting-rod, L. The other end of the rod L is pivoted to a lever, M, the lower end of which is hinged to the body A. The upper end of the lever M projects into such a position that it can be conveniently reached and operated by the driver from the seat F, so that the driver can use both his weight and his strength for propelling the velocipede.

The shaft J works in bearings attached to the body A, and to it is keyed or otherwise secured the hub N of the friction-clutch. In notches in the opposite sides of the hub N are placed the inner ends of the arms O, the outer ends of which have transverse slots formed in their inner edges to receive a ring-flange, P, formed upon the side of the gear-wheel Q.

To the clutch-arms O are attached the ends of springs R, the other ends of which are attached to the outer ends of arms S. The inner ends of the arms S are attached to the hub N.

With this construction, when the shaft J and hub N are turned forward the movement causes the arms O to clamp the flange P, so that the gear-wheel Q will be carried forward with the shaft J. As the forward movement of the shaft J stops or a rearward movement begins, the springs R draw back the arms O, releasing the flange P and allowing the gear-wheel Q to continue its onward movement unchecked.

Upon the side of the wheel Q are formed bevel-gear teeth, which mesh into the teeth of a small beveled-gear wheel, T, attached to the forward end of the shaft U, which revolves in bearings attached to the body A, and has a larger beveled-gear wheel, V, attached to its rear end. The teeth of the beveled-gear wheel V mesh into the teeth of one or the other of the two beveled-gear wheels W X, placed upon the shaft Y, and connected with the said shaft by a spline or other suitable means, so that they will carry the said shaft Y with them in their revolution, but may be moved upon the said shaft to throw the gear-wheel W into gear when the velocipede is to be driven forward, and to throw the gear-wheel X into gear when the velocipede is to be driven to the rearward or backed.

The shaft Y revolves in bearings in supports Z, attached to the body A, and to its ends are attached the drive-wheels *a*. The gear-wheels W X may be moved to reverse the motion by a lever or other suitable means.

To adapt the velocipede to be used in the water, paddles *b* may be attached to the spokes of the drive-wheels *a*; or the velocipede may be driven by a screw, *c*, placed between the rear parts of the boats that form the body A and attached to the rear end of the shaft *d*. The shaft *d* revolves in bearings in hangers *e*, attached to the under side of the deck between the boats. Upon the forward part of the shaft $d$ is placed a worm-wheel, $f$, to engage with worm-teeth formed upon the gear-wheel Q. Upon the forward part of the shaft $d$ is placed a small beveled-gear wheel, $g$, the teeth of which mesh into the teeth of a beveled-gear wheel, $h$, pivoted to a bracket, $i$, attached to the under side of the deck of the body A. With the gear-wheel $h$ is rigidly connected a worm-wheel, $j$, which meshes into the worm-teeth of the gear-wheel Q. The worm-wheel $f$ and the beveled-gear wheel $g$ run loose upon the shaft $d$, and one or the other is made to carry the shaft $d$ with it in its revolution, according as the velocipede is to be driven forward or backward, by a sliding clutch, $k$, placed between them upon the shaft $d$, so that it can be thrown into gear with either, as may be required. The clutch $k$ can be shifted by a lever or other suitable means.

The velocipede, when used in the water, is guided by a rudder, $l$, pivoted to the rear part of the deck of the body A. To the upper end of the rudder $l$ is attached a cross-head, $m$, to the ends of which are attached the rear ends of two cords, $n$. The forward ends of the cords $n$ are attached to the ends of the equal-armed lever $o$, which is pivoted to the deck of the body A in such a position that the driver can operate the said lever $o$ with his feet while sitting in the seat F to guide the velocipede.

Having thus fully described my invention, I claim as new and desire to secure by Letters Patent—

1. In a velocipede, the combination, with the rocking seat F, the driving-shaft J, and the driving gear-wheel Q, having ring-flange P, of the friction-clutch N O R S, substantially as herein shown and described, whereby an intermittent power can be applied without any lost motion, as set forth.

2. In a velocipede, the combination, with the body A and the axle and wheels Y $a$, of the rocking seat F, the connecting bars and arms H I, the shaft J, the friction-clutch N O R S, the gear-wheel Q, having ring-flange P, and the gear-wheels and shaft T V W X U, substantially as herein shown and described, whereby motion will be given to the velocipede by the movements of the seat F, as set forth.

3. In a velocipede, the combination, with the shaft J, the clutch N O R S, and the gear-wheel Q of the driving mechanism, of the lever M, the connecting-bar L, and the arm K, substantially as herein shown and described, whereby hand-power can be used to assist in propelling the velocipede, as set forth.

4. In a velocipede, the combination, with the body A, the rocking seat F, the bars and arms H I, the shaft J, the clutch N O R S, and the gear-wheel Q, having ring-flange P, of the gear-wheels $f$ $g$ $h$ $j$, the clutch $k$, the shaft $d$, and the screw $c$, substantially as herein shown and described, whereby the velocipede can be propelled through the water, as set forth.

HENRI B. BURIN.

Witnesses:
JAMES T. GRAHAM,
C. SEDGWICK.